United States Patent
Butler

(10) Patent No.: US 10,419,147 B2
(45) Date of Patent: Sep. 17, 2019

(54) OPTICAL LINE LOADING USING VARIABLE BANDWIDTH NOISE

(71) Applicant: Alcatel-Lucent USA Inc., Murray Hill, NJ (US)

(72) Inventor: David Butler, Richardson, TX (US)

(73) Assignee: Alcatel Lucent, Murray Hill, NJ (US)

( * ) Notice: Subject to any disclaimer, the term of this patent is extended or adjusted under 35 U.S.C. 154(b) by 5 days.

(21) Appl. No.: 14/502,163

(22) Filed: Sep. 30, 2014

(65) Prior Publication Data

US 2016/0094304 A1    Mar. 31, 2016

Related U.S. Application Data

(60) Provisional application No. 62/045,249, filed on Sep. 3, 2014.

(51) Int. Cl.
- *H04J 14/02* (2006.01)
- *H04B 10/58* (2013.01)
- *H04B 10/293* (2013.01)

(52) U.S. Cl.
CPC ........ *H04J 14/0212* (2013.01); *H04B 10/293* (2013.01); *H04B 10/58* (2013.01); *H04J 14/0221* (2013.01)

(58) Field of Classification Search
None
See application file for complete search history.

(56) References Cited

U.S. PATENT DOCUMENTS

| | | | | |
|---|---|---|---|---|
| 5,566,018 A * | 10/1996 | Lee | ...................... | H01S 3/06795 359/337 |
| 6,271,945 B1 * | 8/2001 | Terahara | ............... | H04B 10/505 398/26 |
| 6,704,511 B1 * | 3/2004 | Kerfoot, III | ......... | H04B 10/296 398/149 |
| 7,251,071 B2 | 7/2007 | Kilper et al. | | |
| 7,822,345 B2 * | 10/2010 | Furst | .................... | H04B 10/296 398/34 |
| 8,542,992 B2 * | 9/2013 | Jones | ................. | H04B 10/2572 398/30 |
| 8,554,081 B2 | 10/2013 | Kovsh et al. | | |

(Continued)

FOREIGN PATENT DOCUMENTS

| | | |
|---|---|---|
| JP | 2007274482 | 10/2007 |
| JP | 2011527861 | 11/2011 |

(Continued)

OTHER PUBLICATIONS

Antil et al., An Overview of DWDM Technology & Network, 2012, IJSTR, pp. 43-46.*

(Continued)

*Primary Examiner* — Kenneth N Vanderpuye
*Assistant Examiner* — Jai Lee

(57) ABSTRACT

An apparatus is provided that includes an optical noise generator and a noise combiner. The noise generator is configured to produce an optical signal having a noise channel. The noise combiner is configured to combine an optical data channel with the noise channel received at one or more add ports to produce an optical output signal. A controller is configured to operate the noise generator or the noise combiner to provide a variable bandwidth of added noise combined with the optical data channel.

34 Claims, 4 Drawing Sheets

(56) References Cited

U.S. PATENT DOCUMENTS

| | | | | |
|---|---|---|---|---|
| 8,873,972 | B2* | 10/2014 | Miyashita | H04B 10/25 398/193 |
| 2002/0067747 | A1* | 6/2002 | Jalali | H04B 10/503 372/9 |
| 2005/0024715 | A1* | 2/2005 | Inoue | H04J 14/0221 359/337 |
| 2005/0190432 | A1* | 9/2005 | Futami | H04B 10/25137 359/299 |
| 2005/0286905 | A1 | 12/2005 | Mohs et al. | |
| 2008/0080865 | A1* | 4/2008 | Muro | H04J 14/0204 398/83 |
| 2009/0297143 | A1* | 12/2009 | Takeyama | H04B 10/07955 398/34 |
| 2010/0008672 | A1 | 1/2010 | Kovsh et al. | |
| 2012/0087658 | A1* | 4/2012 | Jander | H04J 14/02 398/48 |
| 2012/0106968 | A1* | 5/2012 | Nakamura | H04J 14/0212 398/79 |
| 2013/0004163 | A1* | 1/2013 | Aoki | H04B 10/506 398/34 |
| 2013/0004166 | A1* | 1/2013 | Okada | H04J 14/0221 398/34 |
| 2013/0058647 | A1* | 3/2013 | Boertjes | H04B 10/0775 398/38 |
| 2014/0286635 | A1* | 9/2014 | Kaneko | H04J 14/0221 398/34 |
| 2016/0219351 | A1* | 7/2016 | Buchali | H04Q 11/0005 |

FOREIGN PATENT DOCUMENTS

| | | |
|---|---|---|
| JP | 2013141159 | 7/2013 |
| WO | WO 98/27674 A1 | 6/1998 |
| WO | 2010006014 | 1/2010 |
| WO | WO 2013/170909 A1 | 11/2013 |
| WO | PCT/US2015/048130 | 12/2015 |

OTHER PUBLICATIONS

Zyskind et al., Optically Amplifed WDM Networks, 2011, Elsevier Inc., p. 381.*

Bennett et al., Superchannels, flex-grid, multilayer switching key developments for next-gen transport networks, 2013, Lightwave, pp. 1-6.*

Translation of Notice of Reasons for Rejection dated Aug. 14, 2018 for Japanese Application No. 2017-512342, 5 pages.

Translation of Communication pursuant to Article 94(3) EPC dated Aug. 17, 2018 for European Application No. 15 763 751.3-1220, 4 pages.

Translation of Examiner'Decision of rejection dated Nov. 27, 2018 for Japanese Application No. 2017-512342, 5 pages.

Korean Office Action dated May 28, 2019 for Korean Patent Application No. 10-2017-7005853, 4 pages.

* cited by examiner

OPTICAL LINE LOADING USING VARIABLE BANDWIDTH NOISE

CROSS-REFERENCE TO RELATED APPLICATION

This application claims the benefit of U.S. Provisional Application Ser. No. 62/045,249 filed on Sep. 3, 2014, commonly assigned with this application and incorporated herein by reference.

TECHNICAL FIELD

The disclosure relates generally, but not exclusively, to optical communications, e.g. apparatus, systems and methods related to loading of optical transmission paths.

BACKGROUND

This section introduces aspects that may help facilitate a better understanding of the inventions. Accordingly, the statements of this section are to be read in this light and are not to be understood as admissions about what is prior art or what is not prior art.

Some installed optical communications systems, particularly submerged systems, use amplifiers running in a constant power mode. These systems typically require that an optical path, or line, is presented with a constant total power irrespective of the number of channels deployed. To achieve this, additional optical signals are sometimes introduced to maintain the line loading at a desired level. The amplitude of these sources may be adjusted as needed to attain the desired constant power loading of the optical path.

SUMMARY

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter, or to delineate the scope of the disclosed subject matter. Its sole purpose is to present some concepts in a simplified form as a prelude to the more detailed description that is discussed later.

One embodiment provides an apparatus that includes an optical noise generator and a noise combiner. The noise generator is configured to produce an optical signal having a noise channel. The noise combiner is configured to combine an optical data channel with the noise channel received at one or more add ports to produce an optical output signal. A controller is configured to operate the noise generator or the noise combiner to provide a variable bandwidth of added noise combined with the optical data channel.

In some embodiments the noise combiner includes comprises an optical add-drop multiplexer (OADM). In some embodiments the OADM has a plurality of add ports and the optical noise generator provides a corresponding plurality of noise outputs, each add port being configured to provide a different filter response. The controller is configured to selectively enable each add port, thereby producing a noise envelope of the added noise. In some embodiments the OADM is a reconfigurable OADM (ROADM). The ROADM may be configured to operate in a flex-grid optical communication system.

The noise combiner may have a plurality of add ports. In some embodiments the optical noise generator has a corresponding plurality of noise sources, each noise source being configured to have a different noise spectrum. The controller is configured to selectively enable each noise source, thereby producing a noise envelope of the added noise. In some embodiments the noise generator further includes a plurality of noise sources each being connected to a corresponding one of the noise add ports. At least one of the noise sources may be configured to produce a controllable variable noise spectrum.

In some embodiments the noise generator and the noise combiner are configured to cooperate to add noise that includes a first noise spectrum at a first of the add ports, and a second noise spectrum at a second one of the add ports. The first and second noise spectra may partially overlap.

Some embodiments further include comprising a splitter/combiner configured to combine noise spectra from two noise sources from the noise generator and to provide the combined spectrum to a single add port of the noise combiner. In some embodiments the noise combiner is located in a submarine optical communication span. In some embodiments the noise generator is controllable to maintain about a constant optical power of an optical signal produced at the noise combiner output. In some embodiments the noise generator switches a number of partially overlapping or non-overlapping fixed-spectrum noise sources to produce a composite noise spectrum.

In some embodiments the noise is quantized into finite spectral bands and an envelope of the quantized noise bands is adjusted to maintain a constant optical power of an optical signal produced at the noise combiner output port. The noise generator may include a superluminescent diode configured to produce an optical signal on the noise channel.

Embodiments may include an optical multiplexer configured to combine outputs of a plurality of optical transponders and direct the combined plurality toward noise combiner data input port. In some cases the channel bandwidth of the transponders is an integer multiple of about 12.5 GHz. In some embodiments the channel bandwidth of the transponders is selected from the group consisting of about 25 GHz, about 37.5 GHz, about 50 GHz, and about 62.5 GHz.

Another embodiment provides method, e.g. of configuring an optical apparatus. The method includes configuring an optical noise generator to produce an optical signal having a noise channel. A noise combiner is configured to combine an optical data channel received at an input port with the noise received at one or more add ports to produce an optical output signal. A controller is configured to control a variable bandwidth of added noise combined with the optical data channel by the noise channel.

Further embodiments of the method may include configuring the apparatus as described in one or more of the embodiments described above.

Additional aspects of the invention will be set forth, in part, in the detailed description, figures and any claims which follow, and in part will be derived from the detailed description, or can be learned by practice of the invention. It is to be understood that both the foregoing general description and the following detailed description are examples and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings throughout which like features are referred to by like references, wherein.

DETAILED DESCRIPTION

Figure 1:
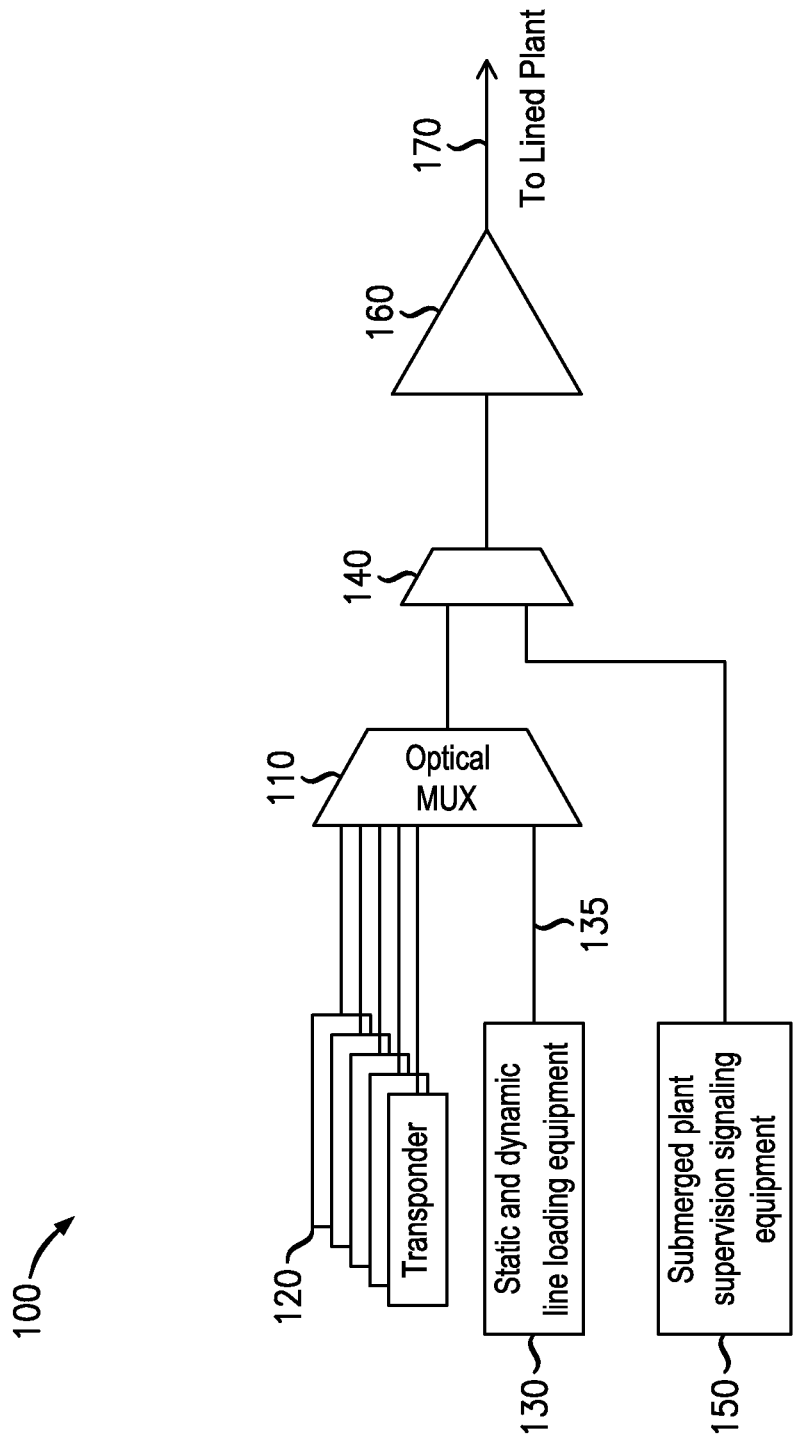
FIG. 1 illustrates a conventional approach to loading an optical fiber using a CW light source to maintain constant intensity.

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments provide apparatus, systems and methods for loading optical transmission lines. In some conventional systems, continuous wave (CW) lasers are substituted in place of optical channels. The multiple CW loading lines are multiplexed together with the traffic channels to maintain a constant power to the line. These CW lines typically have a maximum power of about 10 dB above the traffic channel power so that a single loading line contributes the same optical power to the line as a two or more traffic channels. As the number of traffic channels on the system grows, the power in the loading lines is gradually reduced. Such systems may suffer from various deficiencies. For example, the load signal may interact with co-propagating data traffic by nonlinear effects.

In contrast to such conventional systems, embodiments described herein provide loading in a multiple-channel optical communication system by introducing noise in one or more of the channels. But rather than adjust the amplitude of the noise signals to maintain constant power on the optical line, instead the bandwidth of the noise signal in the affected channel(s) is adjusted. Benefits expected relative to conventional line loading techniques include lower nonlinear interactions between the noise and traffic signals, and relatively simpler implementation, as no physical control loop between the multiplexer (ROADM) and the line loading signal generator is required. Thus existing terrestrial equipment may be retrofitted with embodiments described here at relatively low cost.

FIG. 1 illustrates a system 100 that exemplifies a conventional approach to loading an optical fiber using a CW light source to maintain constant intensity. An optical multiplexer (MUX) 110 receives channel signal outputs from optical transponders 120, along with an optical loading source 130 that provides an optical load signal 135. The output of the MUX 110 may also be further optically multiplexed via a MUX 140 with control signals from, e.g. submerged plant supervision signaling equipment 150. The multiplexed output signal may be used in wavelength-division multiplexed optical communications networks. An amplifier 160 may amplify the optical signal output by the MUX 140 for transmission via a fiber 170. The optical load signal 135 may be used to provide approximately constant power loading of fiber 170.

The example of the system 100 is typical of many prior art systems in which optical power loading of the fiber 170 is held approximately constant via the optical loading source 130. The signals from the transponders 120 are expected to be adversely impacted by the presence of the optical load signal 135, e.g. channel cross-modulation due to nonlinear interactions between channel signals and the load signal 135.

Figure 2:
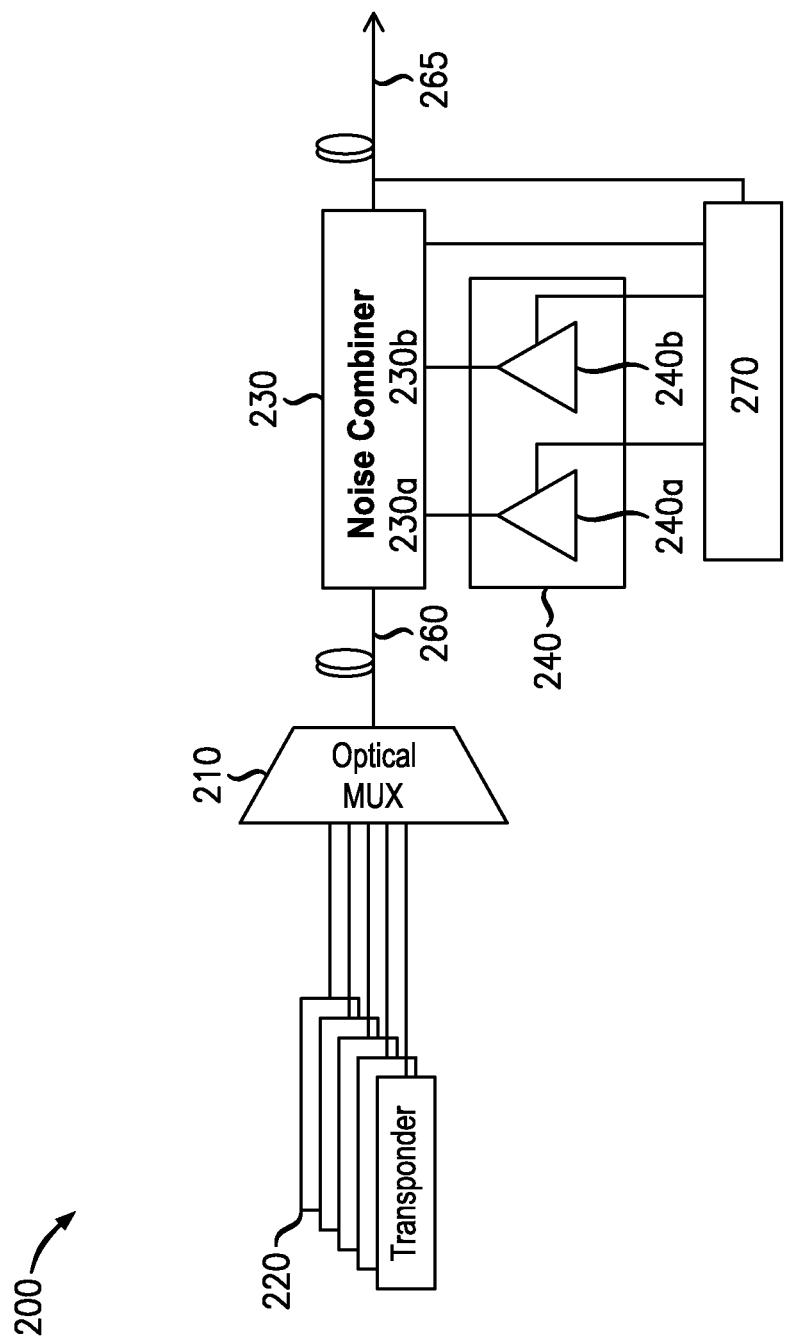
FIG. 2 illustrates an embodiment of an apparatus illustrating use of a noise combiner to load an optical fiber using a variable bandwidth noise generator connected to one or more add inputs of the noise combiner.

FIG. 2 illustrates one example embodiment of a system 200 in which a MUX 210 receives optical channel signals output from transponders 220. A noise combiner 230 receives at an input port the multiplexed optical signal output by the MUX 210 via an unreferenced optical link. A noise generator 240 is connected to one or more add ports of the noise combiner 230, illustratively two add ports 230a, 230b. The noise generator 240 includes one or more noise sources, illustratively noise sources 240a, 240b, respectively connected to the add ports 230a, 230b. Alternatively, a splitter/combiner may be used to combine the outputs of the noise sources 240a, 240b, with the combined signal being connected to a single one of the add ports 230a, 230b. The function of the noise sources 240a, 240b is described further below. The noise combiner 230 multiplexes the output of the MUX 210 with the signal(s) from the noise generator 240 corresponding respectively to the add ports 230a, 230b, and provides an output signal 265 at an output port. The signal 265 may then propagate via an unreferenced optical link to its destination. The noise combiner 230 may be located in a terrestrial or submarine optical span.

Figure 3A:
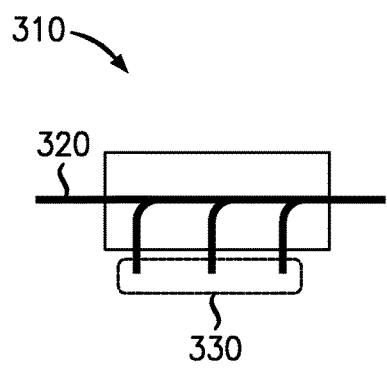
FIGS. 3A and 3B illustrate embodiments of optical devices that may be used in various embodiments, e.g. to implement the noise combiner in the apparatus of FIG. 2.
Figure 3B:
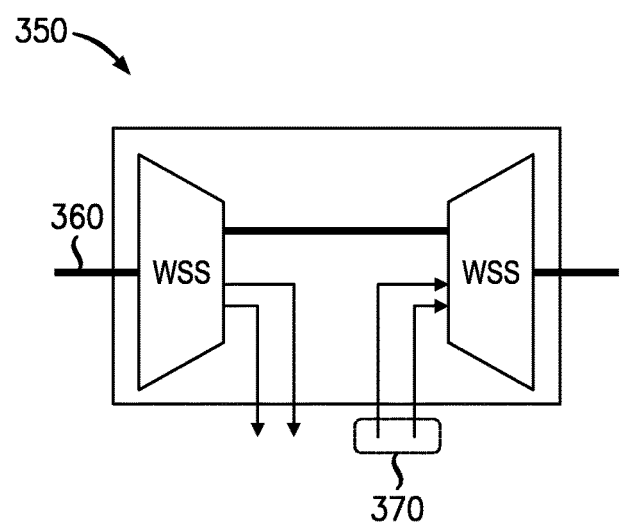

The noise combiner may be any combination of optical devices that perform the function of adding noise from the add ports 230a, 230b to the received signal 260. FIGS. 3A and 3B illustrate two illustrative embodiments. FIG. 3A shows a multiport coupler/combiner 310 that includes a data input port 320 and a plurality of add ports 330. Optical signals, e.g. noise signals from the noise sources 240a, 240b, may be combined with an optical data channel received at the input port 320. FIG. 3B illustrates an OADM 350 that includes a data channel input 360 and a plurality of add ports 370. Those skilled in the optical arts will appreciate that the OADM 350 illustrated in FIG. 3B may present a simplified configuration that is representative of OADMs that may be applicable to the noise combiner 230 in various embodiments. For example, the OADM 350 may a reconfigurable OADM (ROADM), and may be bidirectional.

Referring again toe FIG. 2, the add ports 230a, 230b may be "spare" ports of the noise combiner 230, in that these ports are not otherwise assigned in the system 200 to add data to the signal 260. The noise sources 240a, 240b may be or include, e.g. high power broadband noise sources, such as superluminescent diodes (SLDs). In other embodiments the noise sources 240a, 240b may be or include an erbium-doped fiber amplifier (EDFA) amplified spontaneous emission (ASE) source, or any other device capable of producing wideband optical noise.

FIGS. 4A-4D illustrate aspects of the spectrum of each of the noise sources 240a, 240b. Each of these noise sources has a noise spectrum within which most of the energy of that particular noise source is confined. The upper and lower frequency boundaries of a particular noise spectrum may be those frequencies at which the power of the noise signal drops by about 3 dB relative to a peak power of the noise spectrum. For example, referring to FIG. 4A, the illustrated noise spectrum has −3 dB points at $\lambda_L$ and $\lambda_H$. Thus, the interval between $\lambda_L$ and $\lambda_H$ is the noise bandwidth of the illustrated spectrum. In some embodiments the noise sources 240a, 240b have non-overlapping noise spectra, meaning that the high-wavelength limit of the noise source 240a is lower than the low-wavelength limit of the noise source 240b. In some other embodiments the spectra of the noise sources 240a, 240b at least partially overlap, meaning that the high-wavelength limit of the noise source 240a is higher than the low-wavelength limit of the noise source 240b while the low-wavelength limit of the noise source 240a is lower than the low-wavelength limit of the noise source 240b.

Figure 4A:
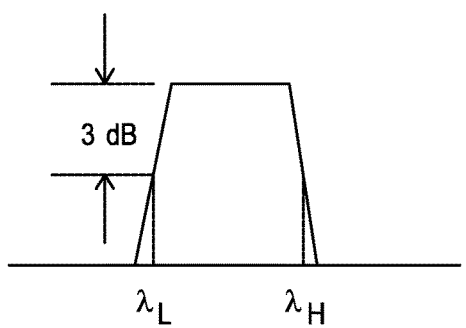
FIGS. 4A-4D illustrate aspects of noise source spectra as applied in various embodiments of the apparatus of FIG. 2.
Figure 4C:
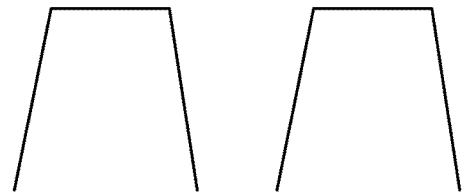
Figure 4B:
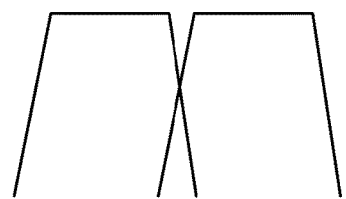

FIGS. 4B and 4C respectively show schematic representations of partially overlapping and non-overlapping noise sources. The combined bandwidth of the overlapping spectra in FIG. 4B may be regarded as the wavelength interval between the low-wavelength limit of the lower-wavelength spectrum and the high-wavelength limit of the higher-wavelength spectrum. In some cases the noise sources 240a, 240b may have about the same noise spectrum, meaning the low-wavelength and high wavelength limits are about equal, and the shape of the spectra produced thereby are qualitatively similar.

Figure 4D:
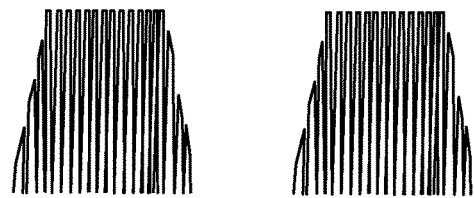

FIG. 4D illustrates noise spectra that may result from the operation of the noise combiner 230 on the noise spectra received from the sources 240a, 240b. The envelope of the quantized noise bands may be adjusted as previously described to maintain a constant optical power of an optical signal produced at the ROADM output port.

Referring again to FIG. 2, an output power controller 270 may operate the noise generator 240 and/or the noise combiner 230 to maintain a total power at the signal 265 that is about constant as determined by, e.g. a photodetector (not shown). Preferably, the total power is controlled within ±15%, more preferably ±10%, and more preferably ±5%. The controller 270 and the feedback path may be implemented in any combination of conventional or novel hardware and software as appropriate.

With respect to the noise generator 240, the amplifier controller 270 may operate the noise sources 240a, 240b such that the noise generator 240 produces noise with a controllable variable noise bandwidth. In some embodiments such control may be provided by, e.g. controlling the noise spectrum of one or both of the noise sources 240a, 240b such that they have a controllable combined bandwidth. In other embodiments, the controller 270 may effect noise bandwidth control by switching a number of partially overlapping or non-overlapping fixed-spectrum noise sources to produce a desired composite noise spectrum.

With respect to the noise combiner 230, the controller 270 may operate to adjust the input bandwidth of the add ports 230a and 230b such that the total power at the signal 265 is about constant. For example, when the noise combiner 230 is implemented as a ROADM, the ROADM add ports may be preconfigured to provide different filter responses, thereby differently filtering optical noise from the sources 240a, 240b. The controller 270 may configure the noise combiner 230 (e.g. ROADM) to select those preconfigured inputs that in combination provide a desired noise envelope of the noise signal added to the data signal. Such embodiments may be advantageous in that ROADM inputs may be selected rapidly, e.g. in a few hundred microseconds or faster, providing the ability to quickly reconfigure a noise signature added to the data signal. Alternatively, the noise combiner (e.g. ROADM) 230 may be dynamically reconfigured such that the add ports provide different filter responses. However, such reconfiguration may require as long as 500 milliseconds, which may be disadvantageous in some applications. Alternatively or in combination, filter elements (not shown) in the noise generator 240 may be configured to provide different noise spectra at the outputs of the noise generator 240. Again these spectra may be preconfigured or dynamically adjusted as appropriate to the specific implementation. The controller 270 may then selectively enable particular parts of the quantized noise spectra generated by noise sources 240a, 240b to provide a noise envelope to the noise combiner as appropriate to the particular application. Thus it is apparent that the bandwidth of the noise added to the signal 265 may be controlled by controlling the output bandwidth of the noise sources 240a, 240b, by controlling the input bandwidth of the add ports 230a, 230b, or controlling both. A single one, or a combination, of these techniques may be used to effectively control the total power of the signal 265. It is expected that under some operating conditions the variable bandwidth of the noise added to the signal 260 will provide superior overall data transmission characteristics of the system 200 by virtue of the ability to adjust the noise bandwidth for different configurations of data transmission channels in optical signal 260.

The system 200 may operate in a "flex-grid" optical network architecture. Those skilled in the optical arts appreciate that a flex-grid optical network provides the ability to configure spectrum allocation for a number of optical channels using spectrum "slots" to form spectrum "slices". Additional information on flex-grid systems may be found in, e.g., International Telecommunications Union (ITU) document G.694.1, "Spectral grids for WDM applications: DWDM frequency grid" (February 2012), incorporated herein by reference in its entirety. For example, and without limitation, spectrum slots in such a system may be about 12.5 GHz, from which channels may be configured having bandwidths that are an integer multiple of about 12.5 GHz, e.g. 25 GHz, 37.5 GHz, 50 GHz, 67.5 GHz, and 100 GHz respectively using 2, 3, 4, 5 and 8 slots. In this context, about means±1 GHz of the nominal frequency value. In some embodiments the channel bandwidth of each of the transponders 220 may correspond to one of these values. Of course, other channel widths are possible, and are expressly contemplated.

While this invention has been described with reference to illustrative embodiments, this description is not intended to be construed in a limiting sense to only the illustrated embodiments.

Unless explicitly stated otherwise, each numerical value and range should be interpreted as being approximate as if the word "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the following method claims, if any, recite steps in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. An apparatus, comprising:
   an optical combiner configured to receive a data signal including channels corresponding to a WDM channel grid;
   an optical noise generator configured to direct optical noise to one or more add ports of said optical combiner; and
   a controller configured to control at least one of the optical noise generator and the optical combiner to:
   maintain an approximately constant total power at an output of said optical combiner by adjusting a noise envelope of a plurality of quantized noise bands to modify a bandwidth of optical noise added to said data signal at unused channel wavelengths of said WDM channel grid.

2. The apparatus of claim 1, wherein the optical combiner comprises an optical add-drop multiplexer (OADM).

3. The apparatus of claim 2, wherein:
   the OADM has a plurality of add ports and the optical noise generator provides a corresponding plurality of noise outputs, each add port being configured to provide a different filter response; and
   the controller is configured to selectively enable each add port, thereby producing the noise envelope of an added noise channel.

4. The apparatus of claim 1, wherein the optical combiner has a plurality of add ports and the optical noise generator has a corresponding plurality of noise sources, each noise source being configured to have a different noise spectrum, and the controller is configured to selectively enable each noise source, thereby producing the noise envelope of the added noise.

5. The apparatus of claim 1, wherein the optical combiner has a plurality of add ports, and the noise generator further comprises a plurality of noise sources each being connected to a corresponding one of the add ports.

6. The apparatus of claim 5, wherein at least one of the noise sources is configured to produce a controllable variable noise spectrum.

7. The apparatus of claim 1, wherein the noise generator and optical combiner are configured to cooperate to add noise that includes a first noise spectrum at a first of the add ports, and a second noise spectrum at a second one of the add ports, the first and second noise spectra partially overlapping.

8. The apparatus of claim 2, wherein the OADM is a reconfigurable OADM (ROADM) configured to operate in a flex-grid optical communication system.

9. The apparatus of claim 1, further comprising a splitter/combiner configured to combine noise spectra from two noise sources from the noise generator and to provide the combined spectrum to a single add port of the optical combiner.

10. The apparatus of claim 1, wherein the optical combiner is located in a submarine optical communication span.

11. The apparatus of claim 1, wherein the noise generator is controllable to maintain about a constant optical power of an optical signal produced at the optical combiner output.

12. The apparatus of claim 1, wherein the noise generator is configured to switch a number of partially overlapping or non-overlapping fixed-spectrum noise sources to produce a composite noise spectrum in a noise channel.

13. The apparatus of claim 1, wherein the noise generator comprises a superluminescent diode.

14. The apparatus of claim 1, further comprising an optical multiplexer configured to combine outputs of a plurality of optical transponders and direct the combined plurality toward an optical combiner data input port.

15. The apparatus of claim 14, further comprising the plurality of optical transponders.

16. The apparatus of claim 14, wherein the channel bandwidth of the transponders is an integer multiple of about 12.5 GHz.

17. The apparatus of claim 14, wherein the channel bandwidth of the transponders is selected from the group consisting of about 25 GHz, about 37.5 GHz, about 50 GHz, and about 62.5 GHz.

18. A method, comprising:
configuring an optical combiner to receive a data signal including channels corresponding to a WDM channel grid;
configuring an optical noise generator direct optical noise to one or more add ports of said optical combiner; and
configuring a controller to control the noise generator and/or the optical combiner to:
produce a controllably variable bandwidth noise channel, and to maintain an approximately constant total power at an output of said optical combiner by adjusting a noise envelope of a plurality of quantized noise bands to modify the bandwidth of the noise channel.

19. The method of claim 18, wherein the controller is configured to control the bandwidth of the noise channel by applying a filter to adjust the noise envelope at one or more of the add ports.

20. The method of claim 18, wherein the controller is configured to control the bandwidth of the optical noise directed to the one or more add ports of the optical combiner.

21. The method of claim 18, further comprising configuring an optical multiplexer to combine outputs of a plurality of optical transponders and direct the combined plurality toward an optical combiner input port.

22. The method of claim 18, wherein the noise generator comprises a superluminescent diode configured to produce the optical noise.

23. The method of claim 18, wherein the noise generator comprises a plurality of noise sources each being connected to a corresponding one of the add ports, and further comprising configuring the noise sources to produce a controllable variable noise spectrum.

24. The method of claim 18, further comprising configuring the noise generator to maintain about a constant optical power of an optical output signal.

25. The method of claim 23, further comprising configuring a splitter/combiner to combine noise spectra from the plurality of noise sources and to provide the combined spectrum to a single one of the optical combiner add ports.

26. The method of claim 21, further comprising coupling the plurality of optical transponders to said optical multiplexer.

27. The method of claim 18, wherein the optical combiner comprises an optical add-drop multiplexer (OADM).

28. The method of claim 27, wherein the OADM is a reconfigurable OADM (ROADM) configured to operate in a flex-grid optical communication system.

29. The apparatus of claim 1, wherein the controller is configured to maintain the total power within ±15%.

30. The apparatus of claim 29, wherein the controller is configured to maintain the total power within ±10%.

31. The apparatus of claim 30, wherein the controller is configured to maintain the total power within ±5%.

32. The method of claim 18, wherein configuring the controller to maintain the approximately constant total power comprises configuring the controller to maintain the total power within ±15%.

33. The method of claim 32, wherein configuring the controller to maintain the approximately constant total power comprises configuring the controller to maintain the total power within ±10%.

34. The method of claim 33, wherein configuring the controller to maintain the approximately constant total power comprises configuring the controller to maintain the total power within ±5%.

* * * * *